US012725589B2

(12) United States Patent
Jancic

(10) Patent No.: US 12,725,589 B2
(45) Date of Patent: Sep. 1, 2026

(54) WIND INSTRUMENT HOLDER AND COMPATIBLE CARRIER DEVICE

(71) Applicant: Silvin M. Jancic, Villmergen (CH)

(72) Inventor: Silvin M. Jancic, Villmergen (CH)

( * ) Notice: Subject to any disclaimer, the term of this patent is extended or adjusted under 35 U.S.C. 154(b) by 55 days.

(21) Appl. No.: 18/613,538

(22) Filed: Mar. 22, 2024

(65) Prior Publication Data

US 2024/0321243 A1 Sep. 26, 2024

(30) Foreign Application Priority Data

Mar. 23, 2023 (CH) .................................... 322/2023

(51) Int. Cl.
*G10G 5/00* (2006.01)

(52) U.S. Cl.
CPC .................................... *G10G 5/005* (2013.01)

(58) Field of Classification Search
CPC ............ G10G 5/00; G10G 5/005; G10D 3/18; G10D 7/10; G10D 9/00; Y10T 403/32409; Y10T 403/32418; Y10T 403/32451
USPC ......... 16/223, 329, 328, 346, 347, 353, 354; 224/265, 266
See application file for complete search history.

(56) References Cited

U.S. PATENT DOCUMENTS 2,921,773 A * 1/1960 Hoelzer .................. B66F 15/00 403/103
5,265,969 A * 11/1993 Chuang .................. A45B 17/00 16/329
6,504,087 B2 * 1/2003 Shulman ................ G10G 5/005 84/387 A
7,237,463 B1 * 7/2007 Lee .......................... B25G 3/38 81/177.8
8,511,207 B2 * 8/2013 Su ............................ B25G 3/38 81/177.8
2005/0145094 A1 * 7/2005 Shumake ............... G10G 5/005 84/453
2013/0263718 A1 * 10/2013 Jancic .................... G10G 5/005 84/387 A
2015/0250330 A1 * 9/2015 Mountz .................. A47D 9/057 297/344.1

* cited by examiner

*Primary Examiner* — Jack W Lavinder
(74) *Attorney, Agent, or Firm* — Servilla Whitney LLC

(57) ABSTRACT

In a wind instrument holder fastenable or fastened to an adapter element of a carrier device, comprising a distance compensation bar and an instrument rest linearly movable and fixable thereon, on which a wind instrument is able to be placed, wherein the distance compensation bar is able to be brought by means of a pivot mechanism into various fixable positions, forming a defined fastening angle with respect to the carrier device, a continuous linear displacement and relative pivoting of the wind instrument holder with respect to the carrier device is to be enabled. This is achieved in that the instrument rest is mounted displaceably and fixably in a linear manner along the longitudinal axis of the distance compensation bar, the pivot mechanism beside the distance compensation bar is formed by a drum closure, a spring, a drum, a push-button plunger with actuation button and a drum closure body, wherein the drum has a fastening lug and is fastenable therewith on the adapter element, and the drum has an inner surface with inner toothing, and the push-button plunger has an outer detent toothing.

15 Claims, 4 Drawing Sheets

WIND INSTRUMENT HOLDER AND COMPATIBLE CARRIER DEVICE

CROSS-REFERENCE TO RELATED APPLICATIONS

This application claims priority to Swiss Patent Application No. CH000322/2023, filed Mar. 23, 2023, the disclosure of which is incorporated herein by reference in its entirety.

TECHNICAL FIELD

The present invention describes a wind instrument holder, fastenable or fastened to an adapter element of a carrier device, comprising a distance compensation bar and an instrument rest, linearly movable and fixable thereon, on which a wind instrument is able to be placed, wherein the distance compensation bar is able to be brought into various fixable positions by means of a pivot mechanism, forming a defined fastening angle with respect to the carrier device, and a carrier device as a Y-shaped frame.

PRIOR ART

A carrier device and wind instrument holder are explained here using the example of a trumpet. A trumpet consists of several components which form the actual trumpet, so that the typical sound of the instrument can be produced by a musician.

Generally only one hand is required for playing a trumpet. Mostly, the valves are actuated by one hand, while the other hand holds the trumpet in the region of the valve housing in the middle of the trumpet between bell and mouthpiece. The trumpeter's right hand must actuate the valves in order to change the pitch. These movements require precision and speed, in order to be able to change quickly and precisely between the various valve combinations. As the left hand holds and stabilizes the entire trumpet, the musician can move the fingers of the right hand more freely and more quickly, in order to play different notes and pitches.

In order to be able to play for a longer time in a relaxed manner, a mount for a trumpet, the strap or the harness, can be used, which are worn around the musician's body and hold the trumpet securely on the body. This is particularly useful for musicians who have to carry the trumpet for a longer period of time, such as for example marching bands or orchestral musicians who play at longer concerts or rehearsals.

A carrier device such as a trumpet strap generally consists of an adjustable band or a cord which is placed around the musician's neck or shoulder. The other end of the strap is fastened to the trumpet, either on a loop or on the ring under the valve housing. Thereby, the musician can distribute the weight of the trumpet on his shoulders or around his neck, which is particularly helpful if he is playing for a longer period of time.

A trumpet harness or trumpet carrier strap is a further type of carrier device which, however, runs over the musician's shoulders and his back and is carried like a rucksack. The harness consists of adjustable straps which are fastened to the trumpet and distribute the weight of the instrument on the musician's shoulders. Some harness models also have a chest support, which offers additional support and distributes the weight of the trumpet still further. The use of a strap or harness can contribute to reducing the stress and fatigue of the muscles which occurs while holding the trumpet. It is particularly useful for musicians who are playing for a longer period of time or are moving, such as for example marching bands or street musicians.

In WO205259 a wind instrument holder is shown having a neck loop, a chest plate fastened thereon and a pivotably movable arm, wherein the pivotably movable arm is able to be fastened held in a balance beam at a predetermined angle relative to the body and to the chest plate. At the outer end of the pivotably movable arm, a tube bearing is provided for the supporting of the tube of the trumpet, of a trombone or of a French horn in the region of the valve housing. The configuration according to WO205259 permits scarcely variable adjustment possibilities for different musicians and their instruments. The wind instrument holder has several components, is nevertheless not able to be adjusted in a sufficiently versatile and simple manner, and does not appear to be very delicate.

A further wind instrument holder is shown in US2005145094, preferably for a horn, which has a more complex shoulder holder, is embodied as a whole in an extremely stable manner and comprises two linear movable tube spacers. At a defined angle of approximately 90° between the two tube spacers, the horn, fastened fixedly on the vertically running tube by a screw connection, can be positioned at various distances with respect to the musician or to the musician's mouth, wherein even both hands can be taken from the instrument. This wind instrument holder is extremely stable and has a plurality of components, wherein the angle of the instrument is not variable. The entire structure is, however, rather bulky, heavy and disadvantageous for today's design requirements. Of course, the production costs for such instrument accessories must also be borne in mind and can lead to a criterion for exclusion by the customer.

A saxophone or clarinet or other wind instruments have a different shape, for which reason such saxophone or clarinet holders can not be used easily.

Presentation of the Invention

The present invention has set the object of creating a wind instrument holder for a trumpet, cornet and other instruments such as trombone or French horn, which is produced in a delicate and lightweight manner from as few components as possible, with maximum robustness, which meets today's design requirements. The wind instrument holder is able to be fastened on a known carrier device, so that a continuous linear displacement and relative pivoting of the wind instrument holder with the respect to the carrier device and hence to the user is possible.

This is achieved by a wind instrument holder according to Claim 1, wherein further combinations of features or respectively minor adaptations of the invention are to be found in the detail description, are illustrated in the figures and have been included into the dependent claims.

A set of a carrier device with wind instrument holder fastened thereon is also presented, which basically has an improved ease of use.

BRIEF DESCRIPTION OF THE DRAWINGS

A preferred example embodiment of the subject of the invention is described below in connection with the attached drawings.

Further features, details and advantages of the invention will emerge from the following description of preferred embodiments of the invention and from the drawings. There are illustrated in FIG. 1 shows a side view of a carrier device for carrying a musical instrument in the form of a Y-shaped frame, on the adapter element of which a wind instrument holder is arranged for a trumpet, trombone or French horn.

FIG. 3 shows an exploded illustration of an embodiment of the wind instrument holder with screwed distance compensation bar, while

FIG. 5*a* shows a wind instrument holder for a flute, while

DESCRIPTION

Figure 1:
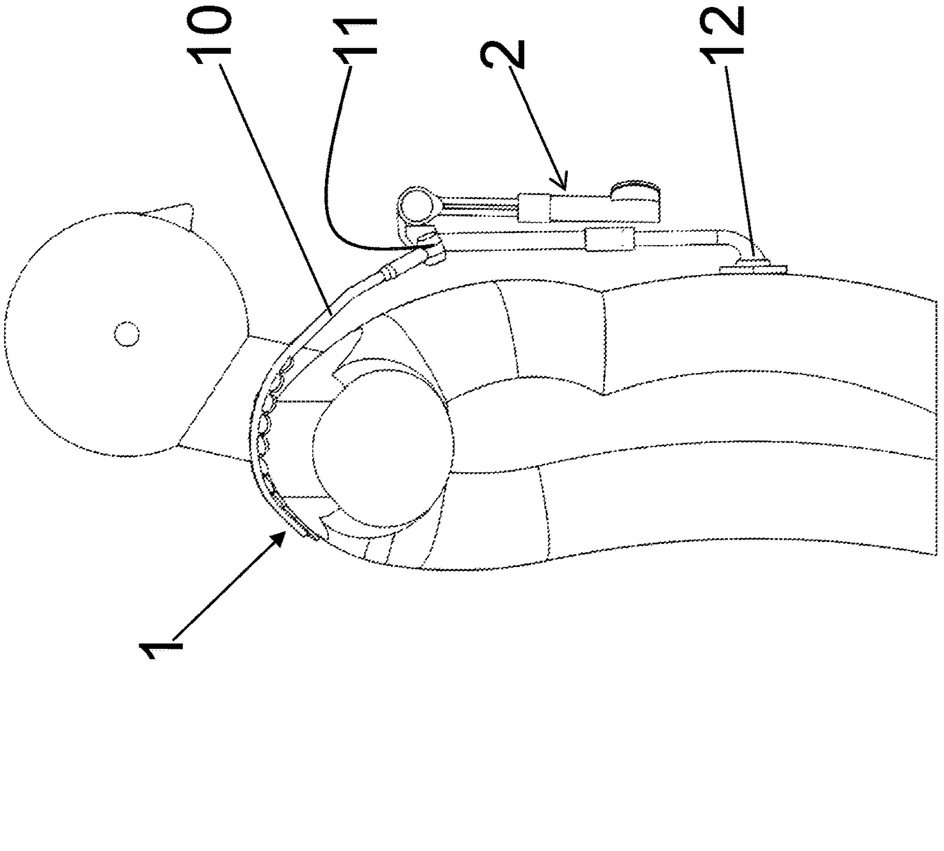

A carrier device 1 for carrying a musical instrument is shown here, on which a wind instrument holder 2 can be fastened. As can be seen in FIG. 1, the carrier device consists here, by way example, of an established Y-shaped frame 10 with two upwardly projecting arms, which are formed in an arched shape at their free ends, and with a third, downwardly projecting arm, which forms a support 12, wherein the two arms and the support 12 converge in an adapter element 11 and are connected to one another there. The arms are preferably articulated, inserted or suspended onto the adapter element 11 by means of a hinge-like connection. A simpler carrier strap can also be used as carrier device 1 for carrying a musical instrument, wherein likewise an adapter element 11 must be arranged. The wind instrument holder 2 is detachably or non-detachably fastened on the adapter element 11.

In FIG. 1, the wind instrument holder 2 is shown in folded state, running approximately parallel to the support 12 of the carrier device 1 and without contact to a wind instrument, such as for example a trumpet.

Figure 2:
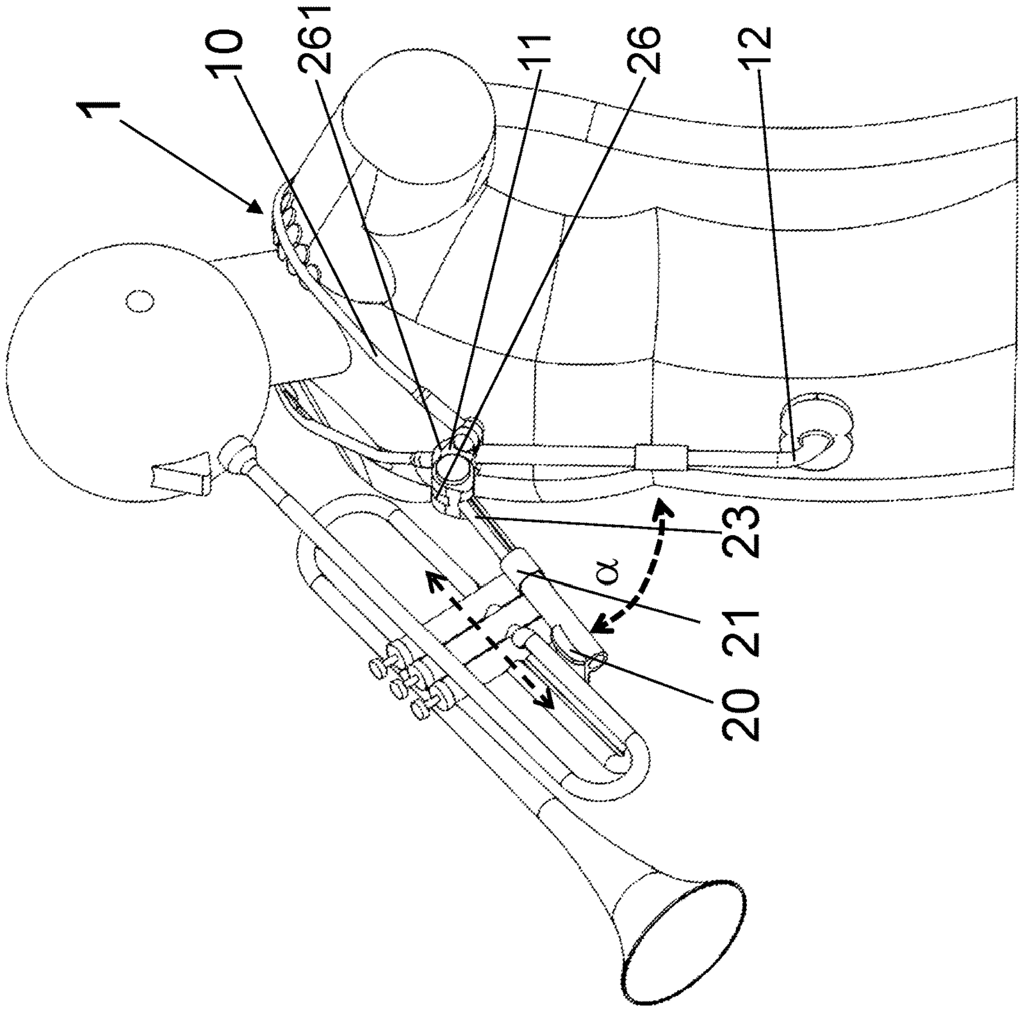
FIG. 2 shows a perspective illustration of the wind instrument holder with trumpet resting thereon in action, wherein a distance compensation bar is aligned relative to the carrier device in a manner ready for playing.

The trumpeter illustrated schematically in FIG. 2 is blowing into the mouthpiece of a trumpet, wherein a portion of the tube of the trumpet rests on an instrument rest 20 of the wind instrument holder 2. The instrument rest 20 is adjusted here in front of a valve housing and lying spaced apart with respect to the bell along the tube. The instrument rest 20 could also rest on the valve housing. The instrument rest 20 is adjustable in a clamped manner with a fastening connecting-piece 21 along a distance compensation bar 23 in various linear distances with a defined and adjustable fastening angle a between the support 12 of the carrier device and the distance compensation bar 23. Depending on the desired fastening angle a, the trumpeter can adjust the alignment of the trumpet relative to his mouth and operating hand, wherein the trumpet rests loosely on the instrument rest 20. The linear movement possibility and the possibility for pivoting movement, which are independent of one another, are indicated respectively by the dashed double arrows.

Through the configuration of the fastening connecting-piece 21 and the instrument rest 20, a linear movement along the distance compensation tube 23 and a clamping is possible. Through the configuration of a drum 26 at the end of the distance compensation tube 23, facing the user, the pivoting movement around the fastening angle a is possible, wherein the drum 26 can be embodied in various ways. The drum 26 has a fastening lug 261, by means of which the drum 26 and hence the entire wind instrument holder 2 is able to be fastened in a detachable manner on the carrier device 1, more particularly on the adapter element 11. The drum 26 can also be fastened or formed on the frame 10, or respectively the drum 26 and the frame 10 or respectively the adapter element 11 can also be manufactured from one piece. Instead of the Y-shaped frame 10, the carrier device 1 can have a reinforced carrier strap with a loop and with a corresponding adapter element 11, so that a pivoting of the distance compensation bar 23 is possible.

The wind instrument holder 2 according to the invention comprises the instrument rest 20, the fastening connecting-piece 21, the distance compensation bar 23, a drum closure 24, a spring 25, the drum 26, a push-button plunger 27 and a drum closure body 28.

All the components, except for the spring 25, can preferably be produced here from a plastic by means of injection moulding or 3D printing. The spring 25 is preferably a metallic helical compression spring with a sufficient number of spring windings, generally cylindrical straight helical compression springs made of steel.

The instrument rest 20 has a deposition body 200, on which the trumpet is held. So that the wind instrument can not slip so easily from the instrument rest 20, deposition wings 2000 are advantageous, which are formed on both sides on the deposition body 200 or are fastened thereon.

The instrument rest 20 has, in addition, a guide tunnel 201, through which the distance compensation bar 23 is able to be directed. The distance compensation bar 23 is preferably embodied in a cylindrical manner, so that the instrument rest 20 with corresponding guide tunnel 201 is mounted in a displaceable manner linearly on the distance compensation bar 23. In order to prevent a rotation of the instrument rest 20 around its own axis, the distance compensation bar 23 has at least one longitudinal groove 230, recessed along the longitudinal axis of the distance compensation bar 23. Within the guide tunnel 201 a cam 2010 is formed, which engages into the longitudinal groove 230.

In the mounted state, firstly the fastening connecting-piece 21 is placed on the distance compensation bar 23 before it is operatively connected with the instrument rest 20 which is likewise mounted with the guide tunnel 201. The fastening connecting-piece 21 is configured as a short tube, the channel of which is guided via the distance compensation tube 23 and a portion of the guide tunnel 201. On the inner face of the fastening connecting-piece 21 a connecting-piece stud 210 is arranged, which is guided through a channel, not illustrated, on the tunnel outer surface 2011 into an annular groove N when the fastening connecting-piece 21 is directed via the guide tunnel 201 and the distance compensation bar 23.

When the fastening connecting-piece 21 is placed partially on the instrument rest 20, both components can be fixed on the distance compensation bar 23 by a rotation of the fastening connecting-piece 21 by rotation of a connecting-piece outer surface 22. The connecting-piece outer surface 22 preferably also has a profile. By rotation of the fastening connecting-piece 21 via its connecting-piece outer surface 22, the guide tunnel 201 is fastened on the distance compensation bar 23 by means of a press fit. In the mounted state the wall of the fastening connecting-piece 21 partially surrounds the guide tunnel 201 of the instrument rest 20.

Several possibilities exist for achieving a press fit. The press fit is achieved here as the wall thickness of the guide tunnel 201 is configured unequally, varies in its course along the tunnel circumference, and the channel is not arranged concentrically in the fastening connecting-piece 21.

On rotation of the fastening connecting-piece 21 on the tunnel outer surface 2011, the press fit of the fastening connecting-piece 21 and of the guide tunnel 201 and hence of the instrument rest 20 on the distance compensation bar 23 and hence a fixing against linear movement of the instrument rest 20 on the distance compensation bar 23 is able to be achieved. This is possible continuously, because the inner wall of the guide tunnel 201 can be pressed onto the distance compensation bar 23 by means of rotation of the fastening connecting-piece 21 in any position. The possible linear displacement is indicated here by a dashed double arrow, while the rotation of the fastening connecting-piece 21 is indicated by a curved double arrow.

Figure 3:
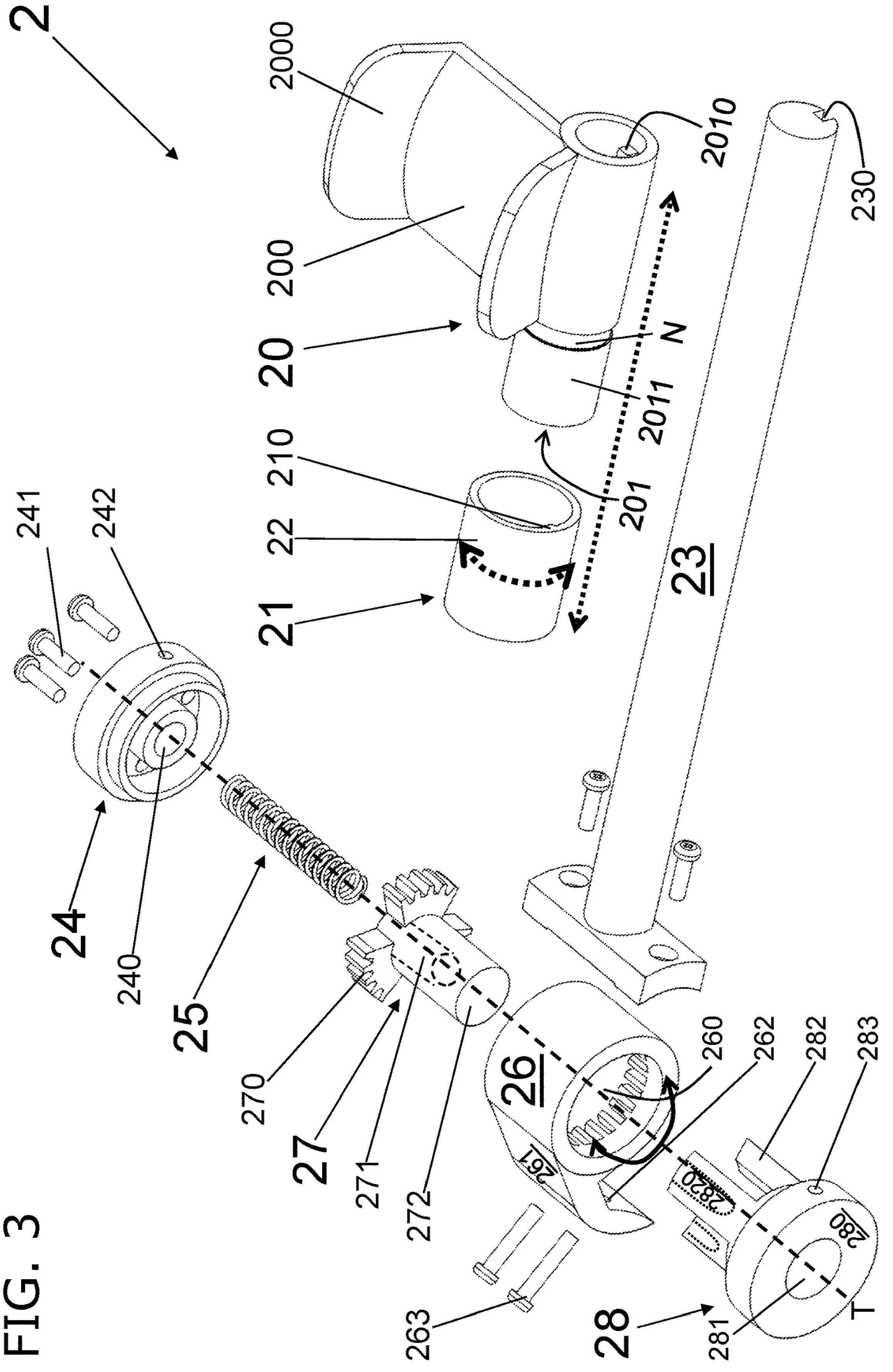

In the embodiment of the wind instrument holder 2 according to FIG. 3, the distance compensation bar 23 is fastened detachably here on the drum closure 24 and the drum closure body 28, so that the distance compensation bar 23 is rotatable around the fastening angle a relative to the drum 26.

On the drum closure 24 a fastening bore 242 is provided, on the drum closure body 28 a bore 283, into which respectively a screw is able to be screwed, which connect a plate on the distance compensation bar 23 detachably to the drum closure 24 and to the drum closure body 28.

The drum closure 24 has a spring mount 240 and can be fastened on the drum 26 or respectively on the drum closure body 28 by means of bores and fastening means 241. In the spring mount 240 the helical spring 25 is mounted, which is introduced into a spring recess 271 on the push-button plunger 27. The push-button plunger 27, in mounted state, projects partially through the interior of the drum 26, while the drum closure 24 is accordingly fastened as one-sided closure of the drum 26. An actuation button 272 of the push-button plunger 27 projects, with mounted spring 25 on the side lying opposite the drum closure 24, out from the drum 26 and a ring 280 with central closure body recess 281.

For fastening the drum closure 24 on the drum closure body 28, with drum 26 mounted movably therebetween, through-holes are arranged in the drum closure 24 and threaded bores 2820 in several fastening webs 282, which project away from the ring 280. Here, three through-holes are arranged in the drum closure 24 and three fastening webs 282 are arranged on the drum closure body 28, which are selected embodied with three fastening means 241 as screws, by which drum closure 24 and drum closure body 28 are able to be screwed to one another.

In the assembled state, the spring 25 projects into the drum 26. The inner surface 260 of the drum 26 has an internal toothing which is embodied here over the full circumference along the inner surface 260.

The drum 26 has, in addition, a fastening lug 261 by which the drum 26 is able to be fastened to the adapter element 11 of the carrier device 1. A plug connection, rivet connection or a screw connection of the drum 26 on the adapter element 11 is possible, wherein the required fastening means must be used accordingly. Here, lug fastening means 263 are preferably embodied as screws which are guided through through-bores 262 in the fastening lug 261 and are thereby screwed on the adapter element 11.

In the assembled state, a detent toothing 270, formed externally on the push-button plunger 27, cooperates with the inner toothing on the inner surface 260, wherein the teeth, lying opposite, can be brought into engagement. When mounted, the spring 25 projects into a spring recess 271, recessed centrally in the push-button plunger 27. The push-button plunger 27, with its outer detent toothing 270, is in engagement with the inner toothing on the inner surface 260. Against the force of the spring 25, the push-button plunger 27 can be partially surrounded by the drum 26 and moved in a guided manner in the direction of the drum closure 24, whereby the detent toothing 270 and the inner toothing are moved apart and the drum 26 is rotatable relative to the drum closure 24 and to the drum closure body 28. As the distance compensation bar 23 is fixed or formed on the drum closure 24 and drum closure body 28, a rotation of the distance compensation bar 23 relative to the drum 26 is possible around the drum axis T.

Figure 4:
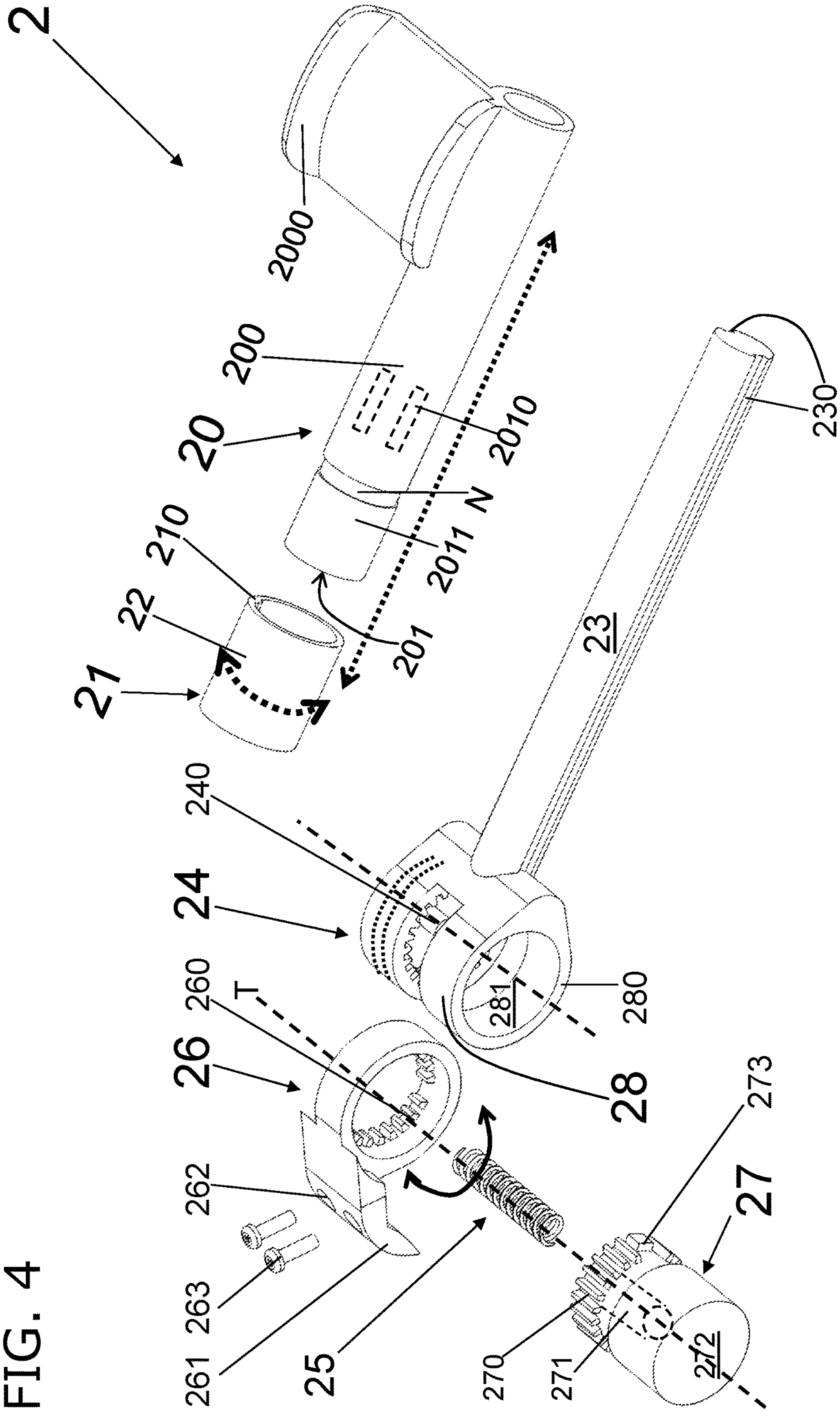
FIG. 4 shows a perspective exploded illustration of a simplified embodiment of the wind instrument holder with a distance compensation bar formed at least onto a drum closure.

The drum closure body 28 closes off the drum 26 on one side and serves for guiding the push-button plunger 27. For this, the drum closure body 28 has a ring 280 with a central closure body recess 281, so that the actuation button 272 of the push-button plunger 27 projects through the closure body recess 281 out of the drum 26 or respectively the drum closure body 28. A slightly modified embodiment of the wind instrument holder 2 is illustrated in FIG. 4, wherein the instrument rest 20 and the fastening connecting-piece 21 is configured as explained above and is placed over onto the end of the distance compensation bar 23 with longitudinal grooves 230. By way of example, two longitudinal grooves 230 are recessed here along the distance compensation bar 23. Two cams 2010 are indicated in dashed lines, projecting into the guide tunnel 201, which are operatively connected to the longitudinal grooves 230, so that a rotation of the instrument rest 20 around the longitudinal axis of the distance compensation bar 23 is prevented.

The distance compensation bar 23 is formed at the opposite end onto the drum closure 24 with spring mount 240 and onto the drum closure body 28 with ring 280 and closure body recess 281. An inner toothing is also arranged on the inner surface of the drum closure 24.

The modified drum 26, with inner surface with inner toothing 260 and formed-on fastening lug 261, is able to be mounted in an insertable manner into an opening between drum closure 24 and drum closure body 28. The spring 25 is guided through the closure body recess 281, traversing the drum 26 on one side into the spring mount 240. The opposite side of the spring 25 is mounted introduced into the spring recess 271 in the push-button plunger 27, while the push-button plunger 27 is guided with its detent toothing 270 ahead through the ring 280 up to the inner surface 260 with inner toothing of the drum 26.

The push-button plunger 27 has one or more retaining cams 273 in the region of the detent toothing 270, which on introducing of the push-button plunger 27 through a recess in the inner toothing of the inner surface 260 and of the drum closure 24 is introduced into a channel which is indicated by dashed double lines. The retaining cam 273 thus prevents the push-button plunger 27 being pressed out by the spring force from the drum 26 and the ring 280 in the direction of the rotation axis.

When the push-button plunger 27 is installed, the spring force of the spring 25 acts and the teeth of the detent toothing 270 engage into the inner toothing of the inner surface 260 and of the drum closure 24, so that the rotation of the drum 26 around the rotation axis is prevented.

When the push-button plunger 27 on the actuation button 272 is pressed in the direction of the rotation axis or drum axis T against the spring force, the teeth of the detent toothing 270 free the teeth of the inner toothing of the inner surface 260 of the drum 26, and the drum 26 can thereafter be pivoted relative to the distance compensation bar 23.

The drum 26, as explained above, has the fastening lug 261, in which the through-bores 262 are arranged, so that by means of the screws 263 a detachable connection with respect to the adapter element 11 can be achieved.

The guided linear displacement of the instrument rest 20 and of the fastening connecting-piece 21 on the distance compensation bar 23 takes place as already described above by a loosening rotational movement of the fastening connecting-piece 21 and a subsequent linear displacement of both components, before the fastening connecting-piece 21 is fixed again by a renewed rotational movement.

According to understanding of these two embodiments, the specialist in the art is able to provide still further modifications of individual components, while maintaining the action mechanisms.

For example, the distance compensation bar 23 can be configured to be formed or fastened only on the drum closure 24 or only on the drum closure body 28, as the concern here is the relative rotation of the distance compensation bar 23 with respect to the drum 26 or respectively to the fastening lug 261.

Figure 5B:
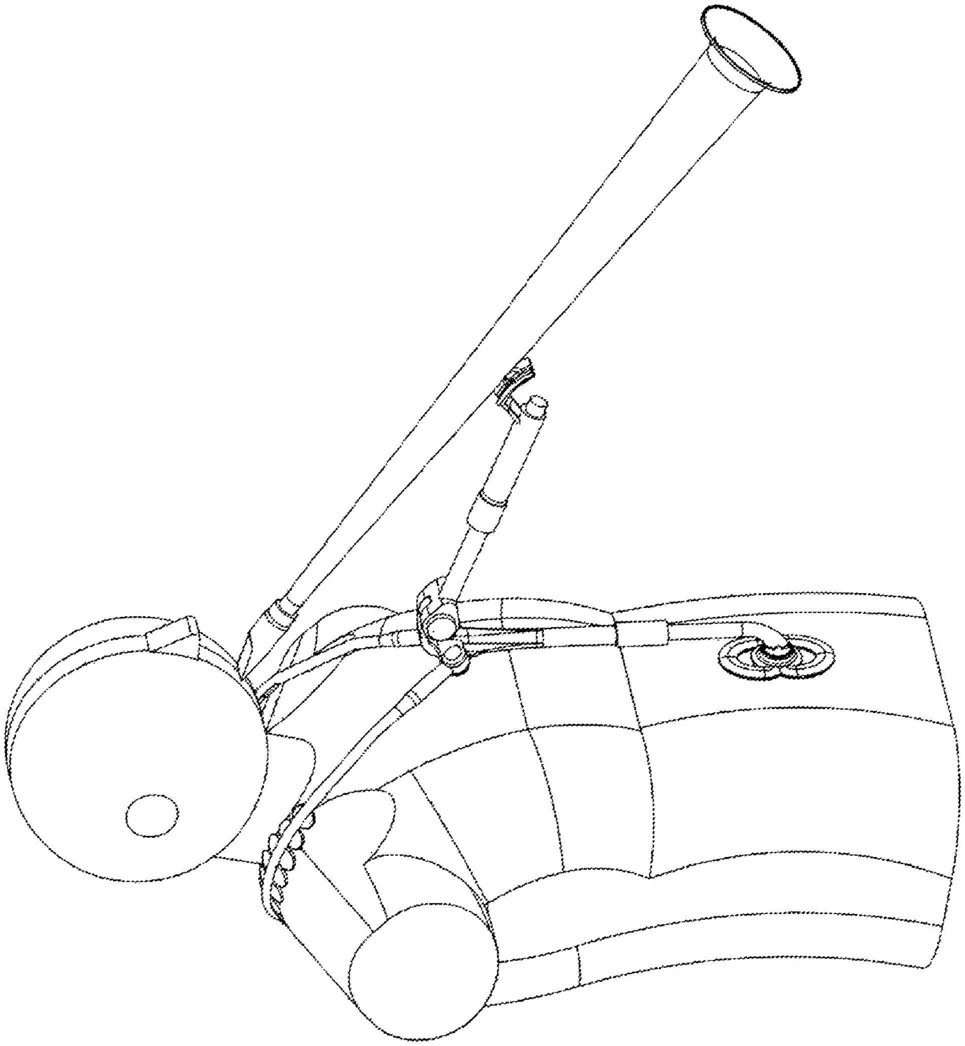
FIG. 5*b* shows a wind instrument holder for a soprano saxophone.
Figure 5A:
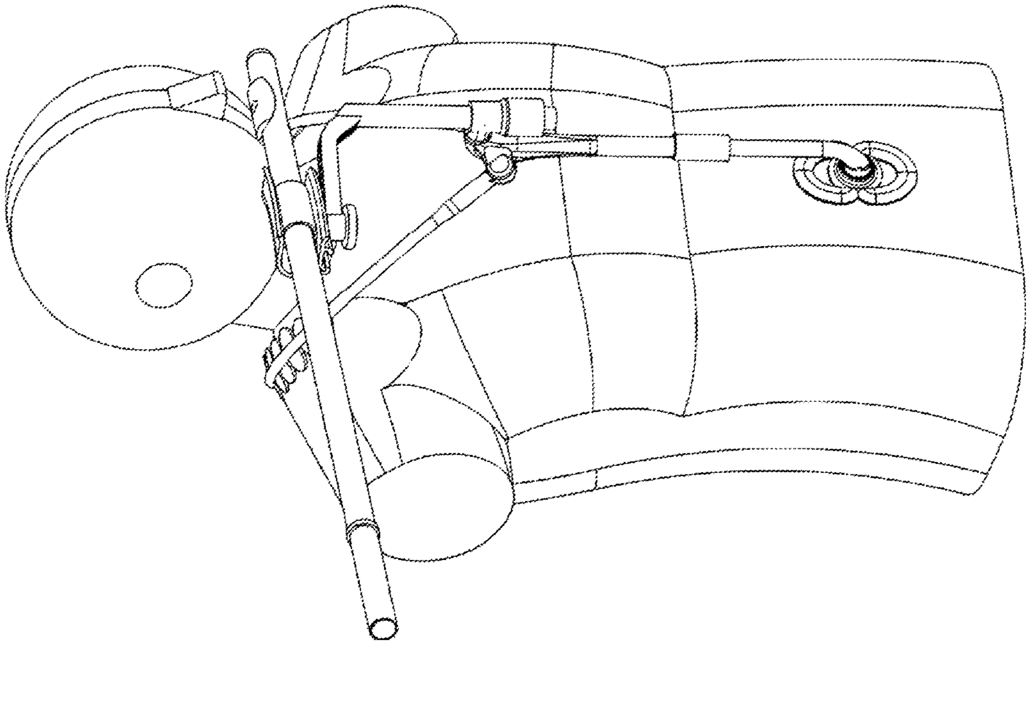

The wind instrument holder 2 described above together with the carrying device 1 as a Y-shaped frame 10 can also be used for a flute and a soprano saxophone, as shown in FIGS. 5*a* and 5*b*.

LIST OF REFERENCE NUMBERS

- 1 carrier device for carrying a musical instrument
  - 10 Y-shaped frame/3 arms (or carrier strap)
  - 11 adapter element (for fastening the wind instrument holder)
  - 12 support of the carrier device
- 2 wind instrument holder (trumpet, cornet, trombone and French horn
  - 20 instrument rest (linearly displaceable on 23)
    - 200 deposition body
      - 2000 deposition wing
    - 201 guide tunnel
      - 2010 cam (internal, at least 1)
      - 2011 tunnel outer surface
    - N annular groove
  - 21 fastening connecting-piece (rotatable, linearly displaceable on 23)
    - 210 connecting-piece stud
  - 22 connecting-piece outer surface
  - 23 distance compensation bar (fastened on drum)
    - 230 longitudinal groove
  - α fastening angle (between 261 and 23)
  - 24 drum closure
    - 240 spring mount
    - 241 fastening means
    - 242 fastening bore
  - 25 spring (helical spring)
  - 26 drum
    - 260 inner surface with inner toothing (over full circumference)
    - 261 fastening lug (formed-on)
    - 262 through-bore in fastening lug
    - 263 lug fastening means (screws, rivets, . . . )
    - T drum axis
  - 27 push-button plunger (movable in direction of the T axis)
    - 270 detent toothing (external)
    - 271 spring recess
    - 272 actuation button
    - 273 retaining cam
  - 28 drum closure body (partially open, fixable in 26)
    - 280 ring
    - 281 closure body recess
    - 282 fastening webs (3 or 4 items, screwed)
      - 2820 threaded bores (3 or 4 items)
    - 283 bore

The invention claimed is:

1. A wind instrument holder fastenable or fastened to an adapter element of a carrier device, comprising a distance compensation bar and an instrument rest linearly movable and fixable thereon, on which a wind instrument is able to be placed, wherein the instrument rest is adjustable in a clamped manner with a fastening connecting-piece along the distance compensation bar that is able to be brought by means of a pivot mechanism into various fixable positions, forming a defined fastening angle between a support of the carrier device and the distance compensation bar, wherein the instrument rest is mounted displaceably and fixably in a linear manner along a longitudinal axis of the distance compensation bar, the pivot mechanism formed on the distance compensation bar, the pivot mechanism formed by a drum closure, a spring, a drum, a push-button plunger with an actuation button and a drum closure body, wherein the drum has a fastening lug and is fastened or fastenable therewith on the adapter element, and the drum has an inner surface with inner toothing, and the push-button plunger has a detent toothing, so that a relative pivoting of the distance compensation bar is possible by the defined fastening angle around a drum axis relative to the inner toothing or respectively relative to the drum and to the fastening lug and thereby to the carrier device.

2. The wind instrument holder according to claim 1, wherein on an inner surface of the fastening connecting-piece a connecting-piece stud is formed.

3. The wind instrument holder according to claim 1, wherein the distance compensation bar has at least one longitudinal groove along its longitudinal axis.

4. The wind instrument holder according to claim 1, wherein the instrument rest has a deposition body with deposition wings formed or fastened on both sides.

5. The wind instrument holder according to claim 1, wherein the push-button plunger is arranged in an actuatable manner at least partially projecting through a closure body recess in the drum closure body and into an interior of the drum in a direction of the drum axis against a spring force of the spring.

6. The wind instrument holder according to claim 1, wherein the distance compensation bar is fastened on the drum closure and/or on the drum closure body detachably, directly or indirectly by means of a plate at one end of the distance compensation bar.

7. The wind instrument holder according to claim 6, wherein in the drum closure, at least one fastening bore are recessed and/or in the drum closure body, at least one bore are recessed, into which screws are able to be screwed for fastening the distance compensation bar.

8. The wind instrument holder according to claim 1, wherein the distance compensation bar is formed on the drum closure and/or the drum closure body.

9. The wind instrument holder according to claim 1, wherein the drum closure has a central spring mount, and the push-button plunger has a central spring recess, the spring is able to be mounted in the central spring recess in an installed state, and the spring traverses the drum on one side into the central spring mount.

10. The wind instrument holder according to claim 1, wherein on the push-button plunger an interrupted detent toothing is arranged at an end lying opposite from the actuation button, or a retaining cam is formed in a region of the detent toothing.

11. The wind instrument holder according to claim 1, wherein an inner toothing is also formed on an inner surface of the drum closure.

12. The wind instrument holder according to claim 1, wherein through-holes are recessed in the fastening lug, through which through-holes lug fastening means are able to be inserted and thereby the drum is detachably fixed on the adapter element.

13. The wind instrument holder according to claim 1, wherein the drum and the adapter element or respectively a Y-shape frame are manufactured from one piece.

14. The wind instrument holder according to claim 1, wherein each of the instrument rest, the fastening connecting-piece, the distance compensation bar, the drum closure, the drum, the push-button plunger, and the drum closure body are produced from a plastic by means of injection moulding or 3D printing.

15. A carrier device as a Y-shaped frame with two upwardly projecting arms, which are formed in an arched shape at their free ends, and with a third, downwardly projecting arm, which forms a support, wherein the two upwardly projecting arms and the support converge in an adapter element, wherein on the adapter element the wind instrument holder according to claim 1 is mounted or formed, or respectively the drum is formed on the adapter element.

* * * * *